July 4, 1950 G. I. CARLISLE, SR 2,513,450
RAILROAD TANK CAR OR TRUCK TANK
Filed July 3, 1947 3 Sheets-Sheet 1
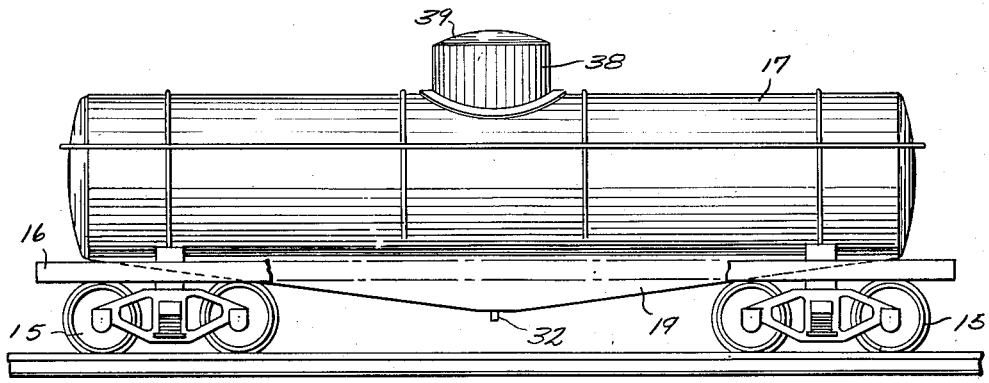
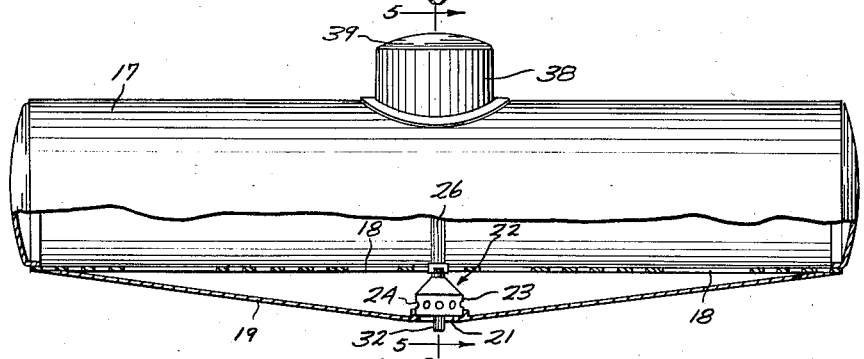
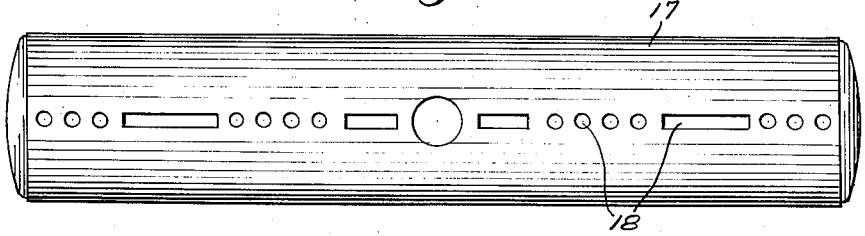
INVENTOR.
Guernsey I. Carlisle Sr,
BY Victor J. Evans & Co.
ATTORNEYS July 4, 1950   G. I. CARLISLE, SR   2,513,450
RAILROAD TANK CAR OR TRUCK TANK
Filed July 3, 1947   3 Sheets-Sheet 2
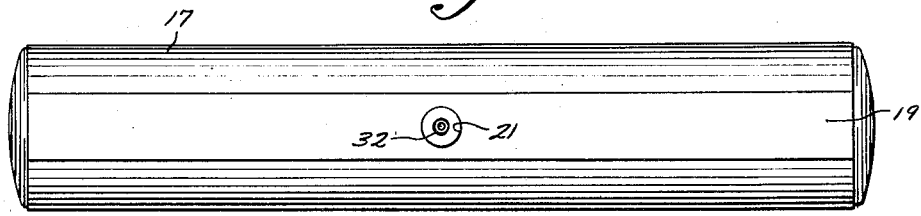
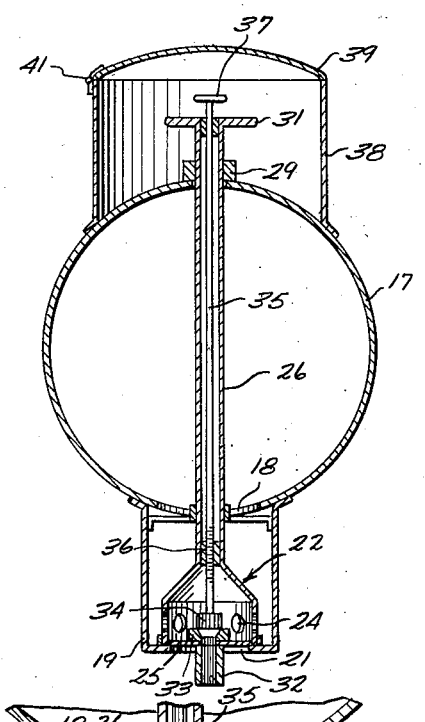
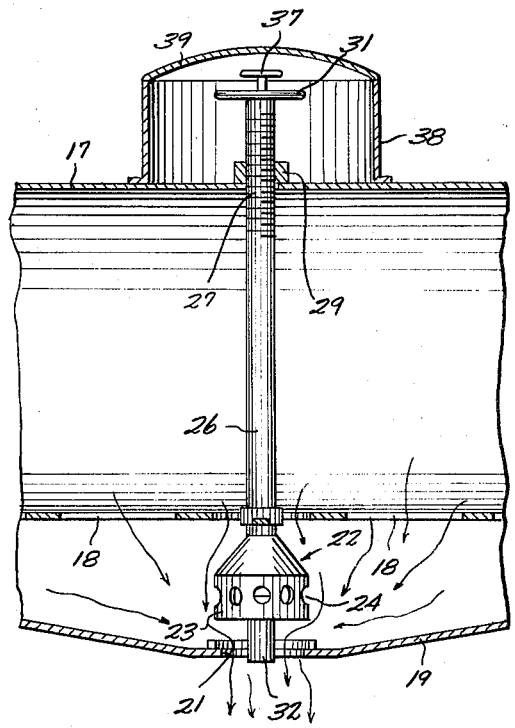
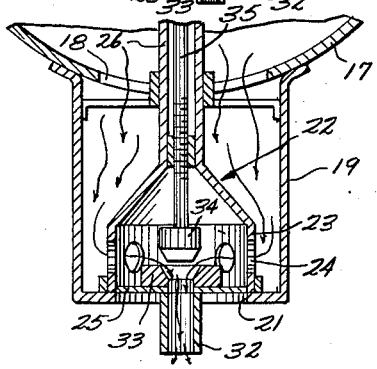
INVENTOR.
Guernsey I. Carlisle Sr,
BY Victor J. Evans & Co.
ATTORNEYS

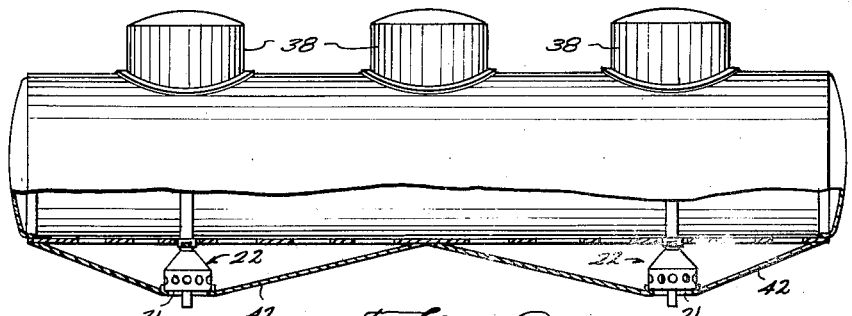
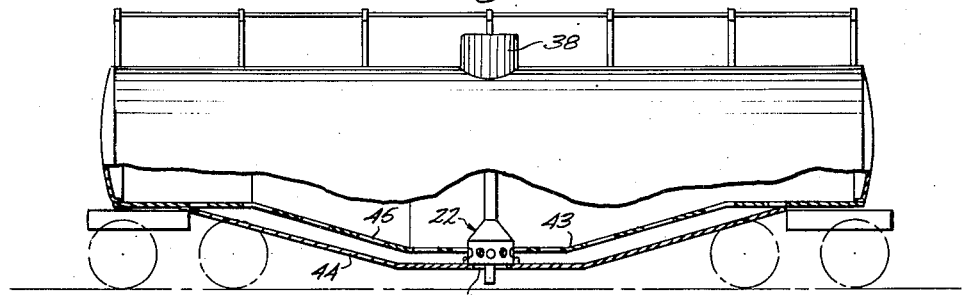
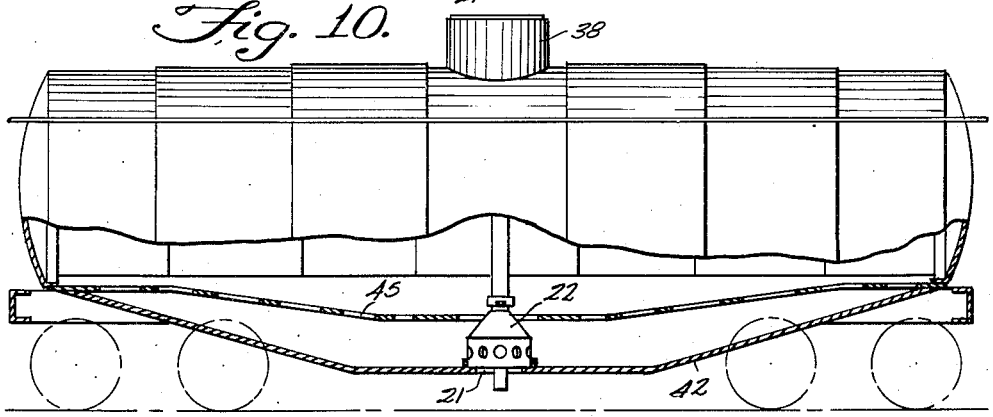

Patented July 4, 1950  2,513,450

UNITED STATES PATENT OFFICE 2,513,450

RAILROAD TANK CAR OR TRUCK TANK

Guernsey I. Carlisle, Sr., Austin, Tex.

Application July 3, 1947, Serial No. 758,916

2 Claims. (Cl. 222—48.2)

1

This invention relates to tank constructions for transporting liquids and solids.

It is an object of the present invention to provide a tank construction for cars or trucks which is so constructed that either liquids or solids can be transported and wherein provision is made for controlling the outlet opening such that by the manipulation of one valve, a large opening for dispensing solids is had and wherein there is incorporated in the large valve a smaller valve opening through which the liquid can be dispensed when liquids are disposed in the tank.

It is another object of the present invention to provide a tank construction with a channel connected to the bottom of the tank and having portions sloping toward a central opening whereby to improve the outlet construction of tanks.

Other objects of the present invention are to provide a tank car construction which is simple, inexpensive to manufacture and efficient in operation.

For other objects and for a better understanding of the invention, reference may be had to the following detailed description taken in connection with the accompanying drawing, in which Fig. 1 is a side elevational view of a tank car embodying the features of the present invention.

Fig. 2 is a side elevational view of the tank removed from the car body and broken away to show the bottom interior thereof.

Fig. 3 is a bottom plan view of the tank and looking in plan upon the outlet openings in the bottom thereof.

Fig. 4 is a bottom plan view of the tank with the channel member connected thereto.

Fig. 5 is a transverse cross-sectional view taken through the valve arrangement and on line 5—5 of Fig. 2.

Fig. 6 is a fragmentary longitudinal cross-sectional view taken through the tank and looking in full upon the valve arrangement.

Fig. 7 is an enlarged cross-sectional view of the valve construction with the external valve element on its seat and the internal valve element raised, as when liquid is to be dispensed.

Fig. 8 is a side elevational view of a tank having a bottom portion broken away to show the two outlet arrangements thereof.

Fig. 9 is side elevational view of a tank car wherein the bottom of the tank itself is depressed into the bottom channel.

Fig. 10 is a side elevational view of a tank car constructed similarly to the tank car shown in

2

Fig. 9 and with the bottom portion broken away to show the tank interior.

Referring now particularly to Figs. 1 to 7, 15 represents rail trucks having beams 16 on which a round or cylindrically shaped tank 17 is rested. This tank 17 has a plurality of bottom openings 18 of various shapes through which liquid or solids are dispensed into a channel 19.

In the bottom of the channel 19 which is inclined from its ends toward the center is an outlet opening 21 adapted to be controlled by a valve arrangement 22. The valve arrangement 22 includes a large cylindrical portion 23 with side openings 24 therein and with a closed bottom 25 adapted to rest in the bottom of the channel and over the opening 21 to close the same. When solids are transported, this large valve will be used. A hollow shaft 26 extends upwardly from the portion 23 and through an opening 27 in the top of the tank 17. The upper part of the portion 26 has screw threads 27 adjustable through a nut 29 resting on the top of the tank. The upper end of the portion 26 has a handle 31 which is rotated and the valve will be lifted to a location as shown in Fig. 7, to dispense the solid material through opening 21.

Connected to the bottom of the portion 23 is an outlet sleeve 32. Inside the portion 23 is a valve seat 33 adapted to be engaged by a valve element 34 which when lifted will permit the flow of liquid outwardly through sleeve 32. A shaft 35 extends upwardly through the portion 26 and has threaded engagement with an internal member 36. As the shaft is turned by means of the handle 37, the valve element 34 will be lifted or lowered. The handle portions 31 and 37 are located in a dome 38 on the top of the tank 17 which can be opened or closed by a cover 39 hinged as indicated at 41 to the top of the dome wall. When liquid is being dispensed, the parts will assume the positions shown in Fig. 7.

It will be apparent as shown in Fig. 8 that two outlet arrangements can be provided at opposite ends of the tank. In this instance two channel elements 42 will be provided respectively at opposite ends of the tank. A valve arrangement 22 is provided with each channel element, 42.

If desired the bottom of the tank can be depressed as indicated at 43. This depression may be extended into a channel 44. Such an arrangement is shown in Figs. 9 and 10. Holes 45 are provided in the depressed portion of the tank. The tank itself can be constructed in any manner as illustrated by the various views.

While various changes may be made in the

I claim:

1. A tank car construction comprising a cylindrical tank having openings in the bottom thereof extending throughout a substantial distance longitudinally thereof, a channel member secured to the bottom of the tank adapted to receive the contents dispensed through the bottom openings thereof and having its bottom inclined with an opening in the low point thereof, and a valve arrangement for controlling the opening in the bottom of the channel, said tank bottom having a depressed portion and depending into the channel, said depressed portion having the bottom openings.

2. A tank car construction comprising a cylindrical tank having openings in the bottom thereof extending throughout a substantial distance longitudinally thereof, a channel member secured to the bottom of the tank adapted to receive the contents dispensed through the bottom openings thereof and having its bottom inclined with an opening in the low point thereof, a valve arrangement for controlling the opening in the bottom of the channel, the opening in the bottom of the channel being of large diameter to dispense solid materials, said valve arrangement including a bottom adapted to extend across the opening to control the same, means for raising and lowering the valve bottom including a hollow shaft extending upwardly through the top of the tank and having threaded engagement therewith, said valve bottom having a small opening to dispense liquids, a valve seat surrounding the small opening, a valve element adapted to fit said valve seat, a shaft projecting upwardly from the valve element and operable through the hollow shaft and from the upper end thereof to open and close the small valve opening.

GUERNSEY I. CARLISLE, Sr.

REFERENCES CITED

The following references are of record in the file of this patent:

UNITED STATES PATENTS

| Number | Name | Date |
|---|---|---|
| 846,392 | Brown | Mar. 5, 1907 |
| 1,568,057 | Carr | Jan. 5, 1926 |